No. 625,986. Patented May 30, 1899.
F. G. PENNOCK.
ADJUSTABLE CRANK FOR BICYCLES OR VELOCIPEDES.
(Application filed Jan. 8, 1898.)
(No Model.)
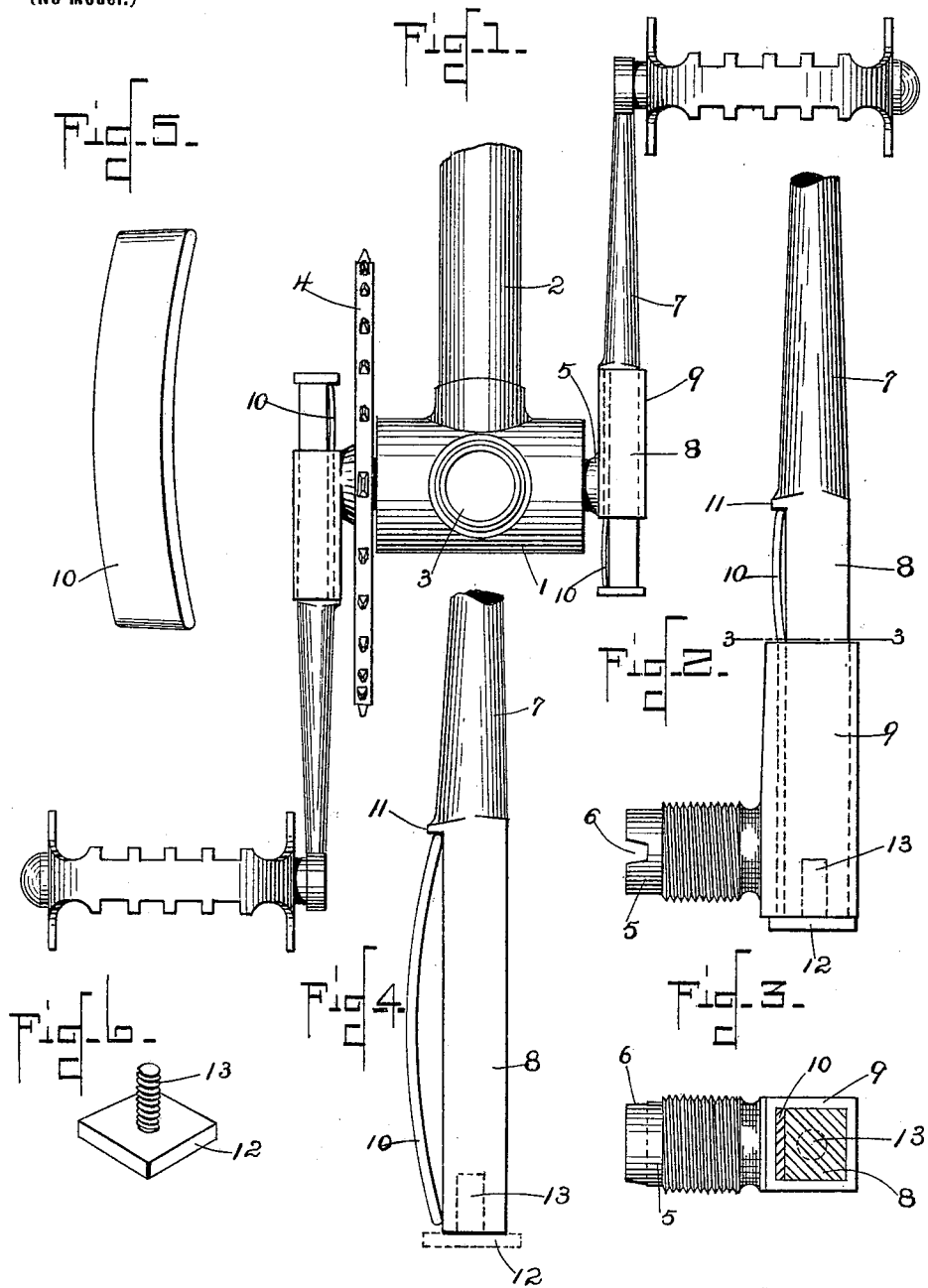
Witnesses
George A. Watson
Charles B. Crocker.
Inventor
Frederick G. Pennock
by W. A. Copeland
his Atty.

UNITED STATES PATENT OFFICE.

FREDERICK G. PENNOCK, OF BRAINTREE, MASSACHUSETTS, ASSIGNOR OF ONE-HALF TO WILLIAM H. DOBLE, OF QUINCY, MASSACHUSETTS.

ADJUSTABLE CRANK FOR BICYCLES OR VELOCIPEDES.

SPECIFICATION forming part of Letters Patent No. 625,986, dated May 30, 1899.

Application filed January 8, 1898. Serial No. 666,008. (No model.)

*To all whom it may concern:*

Be it known that I, FREDERICK G. PENNOCK, a citizen of the United States, residing at Braintree, in the county of Norfolk and State of Massachusetts, have invented certain new and useful Improvements in Adjustable Cranks for Bicycles or Velocipedes, of which the following, taken in connection with the accompanying drawings, is a specification.

The object of my invention is to produce a crank for bicycles and the like which can be adjusted by simple foot-pressure to give a longer or shorter throw, as desired, without dismounting or stopping the wheel. There have been various kinds of attachments made for varying the throw of the crank, but none, so far as I am aware, have been so constructed that by a downward pressure of the foot on the pedal without dismounting the crank can be either lengthened or shortened, as desired, and retained in its adjusted position. Some have been made which vary the length of throw at each up and down stroke, but do not remain in an adjusted position throughout the full stroke or for any length of time desired.

My invention consists in a crank arm and holder with locking attachment, whereby the length of throw of the crank-arm may be varied and the crank secured in its adjusted position by a downward pressure of the foot without dismounting, as will be clearly set forth in the specification.

In the drawings, Figure 1 is a front elevation showing a crank-hanger with my improved crank-holders and cranks attached, the cranks being in their shortened position. Fig. 2 is a side elevation showing a crank-holder and one of the cranks as it appears in its extended position. Fig. 3 is a cross-section on line 3 3 of Fig. 2. Fig. 4 is a side elevation of one of the crank-arms detached and showing the locking-spring in position. Fig. 5 is a perspective of the locking-spring detached. Fig. 6 shows the head with screw-stem, which screws into the end of the crank to form the abutment for one end of the locking-spring.

1 is the crank-hanger; 2 and 3, the seat and frame posts; 4, the sprocket, and 5 the crank-shaft, which is here represented as made in two sections, one section on each crank-holder, and the two sections having respectively a tongue and a groove which fit together. The groove 6 is shown in Fig. 3; but none of the drawings show the section having the tongue, which, however, will be well understood and does not form a part of my invention.

My invention applies equally well where the crank is composed of a single piece. The crank 7 is formed with a shank 8, square-sided up as far as desired, according to the amount of extensibility required. Any other shape except circular would serve the purpose, it being made of a shape not to turn in its holder. The shank fits in a hollow holder 9, which has a rectangular hole through it lengthwise and is cast with or secured to the crank-shaft 5. If the crank-shaft employed be a single piece, then the holder 9 should be detachable. The shank 8 fills the hole, except a space on one side to allow room for the flat spring 10. A shoulder 11 is formed on the crank at the top of the shank, and a cap 12 has a screw 13, which is screwed into a threaded hole in the lower end of the shank. The cap projects over the side of the shank, so that it forms a rest for the end of the spring 10. This spring 10 is flat and bow-shaped, and when straightened out fills the space between the shoulder 11 and the cap 12.

In mounting the crank the shank 8 and spring 10 are inserted in the holder 9 while the cap 12 is detached. The cap then is secured to the end of the shank and prevents displacement of the crank until the cap is unscrewed again. Fig. 2 represents the crank in its most extended position. The tension of the lower part of the spring is sufficient to keep the crank in the extended position under the ordinary pressure to which the pedals are subjected while riding.

Whenever it is desired to shorten the crank, the rider will exert a little extra downward pressure with his foot when the crank is in its upper vertical position, as shown in Fig. 2, taking first one and then the other as it comes around, and they will be shortened up, as in Fig. 1. The shoulder 11 is wider than to merely form an abutment for the end of the spring, so that it also serves as a stop to prevent the crank from being pushed in too far. When the cranks are in the shortened position, as in Fig. 1, and the rider comes to a hill or for any reason desires to have a longer throw of the crank, he will press down on the pedal when in its lower vertical position with sufficient extra pressure to overcome the tension of the spring, and the crank will be pushed out to its lengthened position.

The cap 12 serves as a stop to prevent the crank from being pulled out of the holder when the crank has reached the limit of its proper length of throw.

What I claim is—

1. In a bicycle or velocipede, in combination with a crank-shaft, a holder fixed to the crank-shaft, a crank adjustable in said holder and unitary throughout its length, a tension device which holds the crank at any position to which it is adjusted, the crank being adjustable to increase and decrease the lengths of throw solely by additional pressure on the pedal but varying only when such pressure is exerted and having a length at least as great as the longest radius of rotation, substantially as described.

2. In combination with a crank-shaft, a tubular crank-holder, a crank having a shank which extends through said holder lengthwise and is adjustable therein, said crank being unitary throughout its length and having a length at least as great as the longest radius of rotation, a pedal connected to said crank, a binding-spring within the holder and bearing against the crank-shank which by its tension alone holds the crank at any length to which it is adjusted, the crank being adjusted by a pressure on the pedal exerted only in a direction parallel with the axis of the crank, substantially as described.

3. In combination with a bicycle crank-shaft, a holder slotted lengthwise thereof radially to the crank-shaft, a crank having a shank which is mounted in said slot, a plate-spring which fits in said slot and against the side of said shank, a detachable cap on the butt-end of the shank with projecting edge which forms a rest for one end of said spring, and a shoulder on the shank which forms a rest for the inner end of the said spring, whereby the crank will be held in its adjusted position by the tension of the spring, substantially as described.

4. In a bicycle or velocipede, in combination with a crank-shaft, a crank-holder fixed to the crank-shaft, a crank in said holder unitary throughout its length and a pedal connected therewith, the crank having a length at least as great as the longest radius of rotation and being adjustable to different lengths of throw at the will of the rider by additional pressure on the pedal, and a stop which prevents the crank from becoming disconnected with the holder, substantially as described.

In testimony whereof I affix my signature in presence of two witnesses.

FREDERICK G. PENNOCK.

Witnesses:
WILLIAM A. COPELAND,
EDITH J. ANDERSON.